United States Patent
Gropp et al.

(10) Patent No.: US 7,445,364 B2
(45) Date of Patent: Nov. 4, 2008

(54) HEADLIGHT UNIT FOR SINGLE-TRACK TWO-WHEELED VEHICLES

(76) Inventors: Stephan Gropp, Krattenwer 11, 79650, 79650 Schopfheim (DE); Klaus Freudenberg, St. Peterstrasse 7, 79199 Kirchzarten (DE)

( * ) Notice: Subject to any disclaimer, the term of this patent is extended or adjusted under 35 U.S.C. 154(b) by 205 days.

(21) Appl. No.: 11/199,720

(22) Filed: Aug. 9, 2005

(65) Prior Publication Data
US 2005/0270785 A1    Dec. 8, 2005

Related U.S. Application Data

(63) Continuation-in-part of application No. 10/621,982, filed on Jul. 17, 2003, which is a continuation of application No. PCT/EP02/00384, filed on Jan. 16, 2002, now abandoned.

(30) Foreign Application Priority Data
Jan. 19, 2001    (DE)    ................. 101 02 292

(51) Int. Cl.
*B62J 6/02*    (2006.01)
*B60Q 1/08*    (2006.01)
*B60Q 1/16*    (2006.01)

(52) U.S. Cl. .................. 362/475; 362/465; 362/543

(58) Field of Classification Search ......... 362/460–469, 362/473–476, 543, 544, 545; 315/81, 82, 315/83
See application file for complete search history.

(56) References Cited

U.S. PATENT DOCUMENTS

| | | | |
|---|---|---|---|
| 3,939,339 A | 2/1976 | Alphen | |
| 4,024,388 A | 5/1977 | Skoff | |
| 4,075,469 A * | 2/1978 | Alphen | ........................ 362/467 |
| 4,670,736 A | 6/1987 | Ulrich | |
| 4,686,656 A * | 8/1987 | Morishima | ................... 362/473 |
| 4,868,720 A | 9/1989 | Miyauchi et al. | |

(Continued)

FOREIGN PATENT DOCUMENTS

DE    37 04 029    8/1988

(Continued)

OTHER PUBLICATIONS

Translation of International Preliminary Examination Report for PCT/EP02/00384 dated May 30, 2003.

*Primary Examiner*—Alan Cariaso
(74) *Attorney, Agent, or Firm*—Katten Muchin Rosenman LLP

(57) ABSTRACT

A vehicle headlight unit comprising a sensor-controlled corrective device for the light beam pattern generated by the dipped low beam, at least one central headlight for driving in a straight line and one respective lateral headlight positioned to the right and left thereof, with right-hand headlight for illuminating left-hand bends and the left-hand headlight for illuminating right-hand bends. Each headlight is rotated away from the horizontal position about its optical axis through an incline-compensation angle, so that the outer edge that lies at a distance from the central headlight is in a lower position than the latter. The corrective device comprises an electronic control unit, which activates at least the central headlight within a driving range for a substantially upright driving position and when bends are negotiated and a minimal tilting angle is exceeded, deactivates the central headlight and activates either the left-hand or right-hand headlight.

13 Claims, 3 Drawing Sheets

U.S. PATENT DOCUMENTS

| | | | |
|---|---|---|---|
| 4,870,545 A | 9/1989 | Hatanaka et al. | |
| 5,113,319 A | 5/1992 | Sekiguchi et al. | |
| 5,158,352 A | 10/1992 | Ikegami et al. | |
| 5,426,571 A * | 6/1995 | Jones | 362/466 |
| 5,477,208 A | 12/1995 | Henderson et al. | |
| 5,727,864 A | 3/1998 | Stelling et al. | |
| 5,975,732 A | 11/1999 | Tabata et al. | |
| 6,309,094 B1 * | 10/2001 | Woerner | 362/465 |
| 6,390,656 B1 | 5/2002 | Suda et al. | |
| 6,439,753 B1 | 8/2002 | Sumada et al. | |
| 6,547,425 B2 * | 4/2003 | Nishimura | 362/466 |
| 2002/0039297 A1 * | 4/2002 | Kodaira et al. | 362/475 |

FOREIGN PATENT DOCUMENTS

| | | |
|---|---|---|
| DE | 196 39 526 | 4/1998 |
| DE | 198 17 594 | 10/1999 |
| EP | 0 661 193 | 7/1995 |
| JP | 01-127466 | 5/1989 |

* cited by examiner

HEADLIGHT UNIT FOR SINGLE-TRACK TWO-WHEELED VEHICLES

CROSS-REFERENCE TO RELATED APPLICATION

This application is a continuation in part of U.S. application Ser. No. 10/621,982 filed on Jul. 17, 2003, now abandoned which is currently pending and which is hereby incorporated by reference in its entirety, and which is a continuation of international application number PCT/EP02/00384 filed on Jan. 16, 2002, now abandoned and which is hereby incorporated by reference in its entirety, and which claims priority to and is a continuation of German application DE 101 02 292.1 filed Jan. 19, 2001.

FIELD OF THE INVENTION

The invention relates to a headlight unit for single-track two-wheeled vehicles, especially motorcycles, motor scooters or the like, which experience an inclination around their longitudinal axis while negotiating curves, the unit being provided with a sensor-controlled correction device for the light pattern generated by the dipped low beam.

BACKGROUND OF THE INVENTION

While a motorcycle is negotiating a curve, the inclination of the vehicle causes the light pattern of the dipped beam to deviate considerably from the form required by traffic regulations for the upright vehicle. As a result, the driver's visibility distance in the curve is greatly reduced, and the oncoming traffic is blinded.

In order to counteract such impairment of traffic safety, it is provided according to a known proposal (German Patent 19817594 A1) that the light cone of the dipped beam of a motorcycle negotiating a curve be stabilized by pivoting the headlight around its optical axis, in such a way that the light pattern is maintained substantially constant relative to the roadway centerline for each inclination on the curve.

For this purpose there is provided a control unit that cooperates with two sensors that do not operate on the ground-sensing principle. One measures the yaw of the vehicle around the vertical axis while the other measures the inclination of the vehicle around the longitudinal axis. Because of the pivoting of the headlight, the known headlight-stabilization system does not operate without wear; moreover, it necessitates a complex movement mechanism.

Finally, from German Patent 19639526 A1, there is known, for adaptation of the light distribution of a headlight system during negotiation of a curve, a method in which the light distribution for straight-ahead driving is supplemented by a light distribution with broader horizontal dispersion during negotiation of a curve, by the fact that a plurality of headlights is combined as appropriate.

In another known headlight unit on a motorcycle (Japanese Patent A 01127466), a main headlight is provided on each side with an auxiliary headlight, which is turned on in response to the inclination of the motorcycle during negotiation of a curve. Even though the light beam of the respective auxiliary headlight is directed outward and upward, it fails to illuminate the respective inside of the curve adequately.

U.S. Pat. No. 4,024,388 to Skoff discloses a cornering light system comprising single headlight and two auxiliary cornering lights, which are not comparable with the light system of the present application. In the present application, three equal lights are disposed, a central headlight and two laterally mounted headlights. Advantageously, as will be discussed further herein, this means that one light is functioning at full illumination, whereas the two other lights are either dark or dimmed.

In U.S. Pat. No. 5,727,864 to Stelling appears to disclose three horizontally arranged lights. These lateral headlights are not turned about their optical axis by a predetermined angle.

SUMMARY OF THE INVENTION

In contrast, the object of the present invention is to reduce the system costs significantly compared with the known art by providing a simply constructed headlight unit without wearing parts, thus ensuring trouble-free operation with high operating safety. As regards illumination of the driving lane while negotiating a curve, the headlight unit is designed to achieve improved illumination, corresponding substantially to that of straight-ahead driving; the purpose is to prevent, even if the vehicle is extremely inclined on the curve, an upwardly directed light cone that blinds the oncoming traffic.

In an advantageous embodiment, the inventive headlight unit, which is designed as a kind of multi-faceted headlight, comprises three or more headlights mounted in fixed condition inside a common lamp housing. Each of these headlights may be identical individual headlights commonly available on the market. At least one headlight is disposed in the middle and the others are disposed at the sides thereof, with at least one on the right side and one on the left side respectively.

To achieve better illumination, especially while negotiating a curve, it is expedient to mount the laterally disposed headlights lower than the middle headlight relative to the upright orientation of the vehicle, in such a way that a bow-shaped headlight bar bent downward on both sides is formed. Alternatively, however, other headlight arrangements are also conceivable within the inventive headlight unit, such as an arrangement of all headlights at the same height, an inversely bowed arrangement thereof or even an asymmetric arrangement of headlights. For example, it may be expedient, depending on whether the vehicle will be operated in traffic driving on the right or left, to increase the number of headlights on the right or left side compared with the respective other side, in order to achieve better illumination across the driving lane.

By means of the inventive headlight unit there is achieved significantly improved illumination during negotiation of a curve, not only in the stretch of driving lane immediately ahead of the vehicle but also on the inside of the respective curve. A particular additional advantage is prevention of the blinding effect, not only because only one of the lateral headlights or only the headlights on one side relative to the central headlight are turned on during negotiation of a curve, while the headlights on the opposite side as well as the middle headlight are turned off, but also—and in particular—because the lateral headlight or lateral headlights are mounted in such a way that they are turned around their optical axis, thus causing them to be out of horizontal orientation and, in fact, to be directed toward the inside of the respective curve. Thereby the headlight cone on both sides of the vehicle is directed toward the surface of the driving lane while the said vehicle is inclined during negotiation of a curve, thus substantially maintaining the intended light-beam pattern. This is of particular importance during driving with dipped low beam, because thereby the elongated lateral light branch on the right side remains substantially unchanged, while the blinding effect on the left side—which is otherwise unavoidable with the use of a standard headlight, which shines upward because of the greatly inclined orientation of the vehicle—is prevented.

A suitable angle by which the lateral headlight can be turned to compensate for inclination ranges between 25 and 35°, preferably 30°. In the scope of the inventive configuration, it is provided that a lateral headlight will be turned on only after a roll angle of 10 to 20°, preferably 15°, has been exceeded. This means that changeover from the central headlight to a lateral headlight, especially to the right lateral headlight during negotiation of a left-hand curve and to the left lateral headlight during negotiation of a right-hand curve, takes place only when the vehicle inclination corresponding to this roll angle is reached. In this connection it is self-evident that the changeover from the central headlight to a lateral headlight takes place on entering the curve and the inverse changeover takes place on exiting the curve, or in other words when, at the end of negotiation of a curve, the driver returns his vehicle to upright orientation to the extent that the roll angle becomes smaller than the minimum value during the upward movement.

In order to improve illumination of the driving lane ahead of the driver during negotiation of a curve, it is provided in a further inventive proposal that the headlights laterally adjoining the middle headlight are each mounted in such a way that they are skewed toward the middle headlight, around their axis parallel to the vertical axis of the vehicle, so that their optical axes form, together with a middle plane of the vehicle defined by the longitudinal and vertical axes, a skew angle ranging preferably from 4 to 8°. Expediently, this skew angle can have a different value for the right and left headlights, such that the right headlight in the case of traffic driving on the right and the left headlight in the case of traffic driving on the left is skewed slightly more toward the inside than the respective other headlight; suitable skew angles are, for example, 5 and 7° respectively.

By means of the inventive headlight unit, it is possible, during negotiation of a curve with two-wheeled vehicles, to achieve the same illumination as in straight-ahead driving. Thus, instead of the usually distorted, greatly diminished, poorly illuminated light pattern, a light-beam pattern corresponding substantially to the requirements for straight-ahead driving is achieved even during negotiation of a curve, by virtue of the changeover between the headlights.

In this connection, simultaneous changeover of the headlight lamps is sufficient for continuous illumination of the driving lane without darkness interruptions during the changeover, because the delayed buildup of light output of the headlight being turned on is bridged by the inertia of the incandescent lamp of the headlight being turned off. Alternatively, however, operation of the two headlights can be synchronized in such a way that, when the stabilization device is activated, the headlights are actuated in such a way by the control unit that the lateral headlights are gradually turned on or off before the central headlight is gradually turned off or on respectively. By such synchronized operation during the changeover from one headlight to the other, the headlights can be actuated in a manner that is particularly gentle for the lamps.

In the lamp housing containing the three or more headlights, there are also installed a sensor unit and the control unit. Within the interior of the lamp housing, the individual headlights are each fixed in individually adjustable manner on a mounting plate. The individual headlight lamps are equipped with multiple reflectors for high and low beam, as is customary in the industry. The headlight housing is provided with a common front lens containing dispersion sections adapted to the individual headlights.

The stabilization device comprises, in a manner known in itself, a sensor unit having two sensors, one being a longitudinal-axis sensor that measures the vehicle inclination around the longitudinal axis of the vehicle, and the other being a vertical-axis sensor that measures the vehicle motion around the vertical axis during negotiation of a curve. Each sensor sends signals proportional to the angular velocity to the control unit.

In this connection, the vertical-axis sensor is used to improve the accuracy of measurement of the degree of lean of the vehicle; it contributes to improvement of the operating safety to the extent that its measured values are analyzed in a computer of the control unit as part of a plausibility test, in which the degree of lean determined by the longitudinal-axis sensor is compared with the variation of vehicle movement during negotiation of a curve. As explained, the said computer analyzes the signals of both sensors and determines therefrom the transition between driving in substantially upright orientation and negotiation of a curve, by comparing the respective inclination of the vehicle with the minimum roll angle. In the process, the sensor signals are corrected by filtering, linearization and temperature compensation. The switching instants calculated at the beginning and end of negotiation of a curve are appropriately converted to switching processes of a power circuit for actuation of the headlights.

Advantageously, the control unit contains a safety circuit, which turns on the lateral headlights with appropriate power distribution if the central headlight fails, and which turns on the central headlight with full power if the lateral headlights fail.

By the fact that the inventive headlight unit is composed of individual commercially available headlights, low system costs are achieved. With the exception of the incandescent lamps themselves, the inventive headlight unit is able to operate without wearing parts, thus also contributing to a concomitant increase in its functional safety and useful life. By the fact that the blinding effect is largely prevented, it is also possible to use headlights with greater light outputs. The inventive headlight unit can be provided as a retrofit kit, to be mounted in place of a conventional headlight, on the cable connection thereof.

The sensors used do not rely on ground or speed sensing, but instead operate on the principle of piezoelectric vibration-dependent gyroscopes, which are available on the market.

BRIEF DESCRIPTION OF THE DRAWINGS

A practical example of the invention will be explained hereinafter with reference to the drawing, wherein.

DETAILED DESCRIPTION OF THE INVENTION

Figure 1:
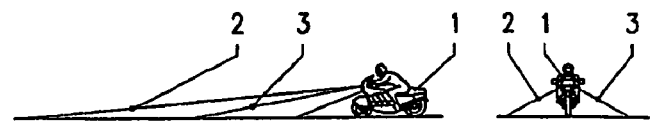
FIG. 1 shows a light-beam pattern of standard type required by traffic regulations for a motorcycle being driven straight ahead.
Figure 1:
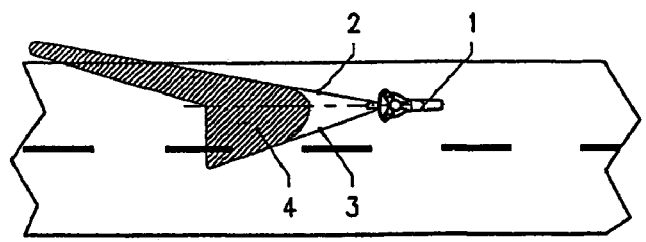

FIG. 1 shows a light-beam pattern in the form required by traffic regulations, for the case of a dipped beam, adapted for traffic driving on the right, of a motorcycle 1 provided with a commercially available headlight, wherein the illuminated area 4 during straight-ahead driving is defined by a left and a right boundary beam 3 and 2 respectively, extending in driving direction.

Figure 2:
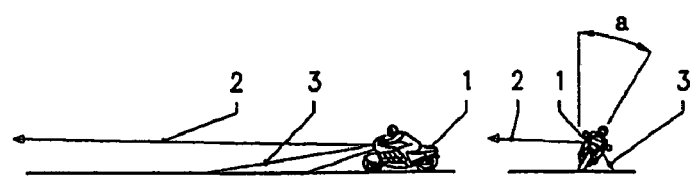
FIG. 2 shows the light-beam pattern according to FIG. 1 in a left-hand curve.
Figure 2:
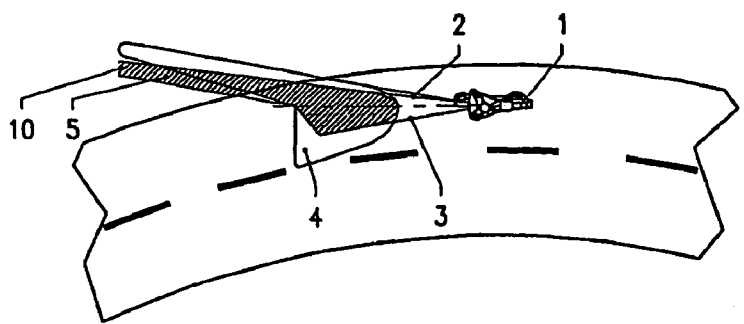

FIG. 2 shows motorcycle 1 in a left-hand curve. Because of its inclination by angle a on the curve, the resulting illuminated area 5 is smaller than that in FIG. 1. A fraction of area 4 on the inside of the curve is no longer illuminated. Right boundary beam 2 no longer reaches the ground and thus becomes blinding beam 10. For the driver of motorcycle 1 equipped with a standard headlight, therefore, the asymmetric branch of the dipped beam no longer contributes to improvement of the view of the road along the right boundary of the driving lane.

Figure 3:
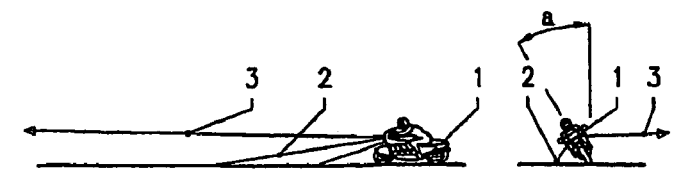
FIG. 3 shows the light-beam pattern according to FIG. 1 in a right-hand curve.
Figure 3:
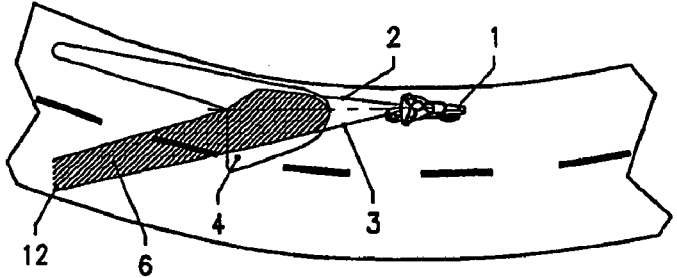

FIG. 3 shows motorcycle 1 during negotiation of a curve bending to the right. Because of the degree of lean of motorcycle 1 by inclination angle a, there is obtained an illuminated area 6 spread across the driving lane. Right boundary beam 2 no longer illuminates the right side of the road, and left boundary beam 3 no longer reaches the ground and thus becomes blinding beam 12. As in FIG. 2, the light pattern deviates considerably from the traffic regulations developed on the basis of safety considerations.

Figure 4:
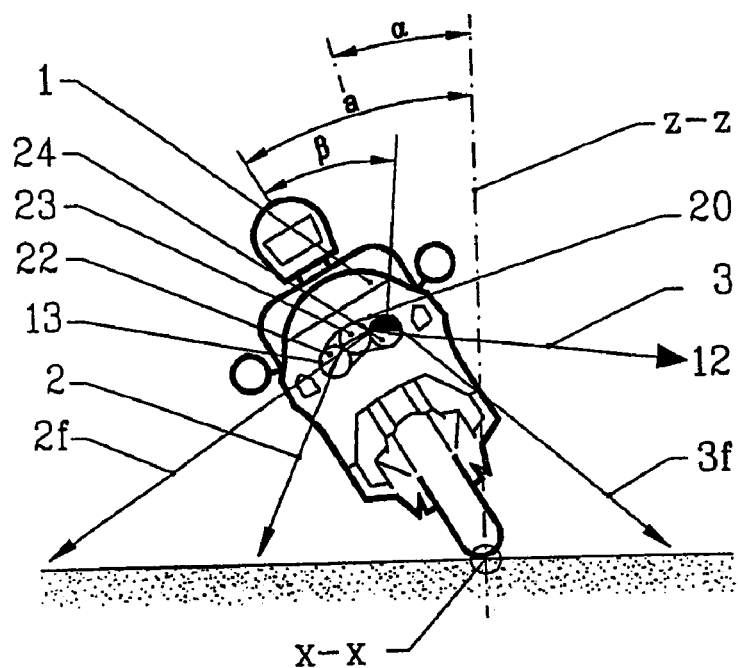
FIG. 4 shows the inventive headlight unit in front view of a motorcycle negotiating a right-hand curve.

FIG. 4 shows an enlarged diagram of motorcycle 1 in front view with the inventive "multi-faceted" headlight unit 13 during negotiation of a right-hand curve. The headlight unit comprises three individual headlights mounted close to each other in a common headlight housing 20, namely a central headlight 23, a right headlight 22 and a left headlight 24. In the illustrated right-hand curve, only left headlight 24 is turned on. Compared with central headlight 23, it is mounted in such a way that it is turned by an angle β toward the outside of the curve, in order to compensate for inclination. The motorcycle itself is inclined by the angle a, which is larger than a minimum roll angle α, which corresponds approximately to an inclination of 15° around longitudinal axis X-X relative to a plane defined thereby together with vertical axis Z-Z. When roll angle α is reached, a control unit turns on left headlight 24. Boundary beams 2 and 3 shown for central headlight 23 in FIGS. 1 to 3 are not a factor in this situation. Instead, left headlight 24 generates boundary beams 2f, 3f, which are directed toward the ground and, because left headlight 24, in order to compensate for inclination, is turned by angle β, which is equal to about 30°, create a light pattern that corresponds approximately to the required pattern even during negotiation of a curve, as shown in the following FIGS. 5 and 6.

Figure 5:
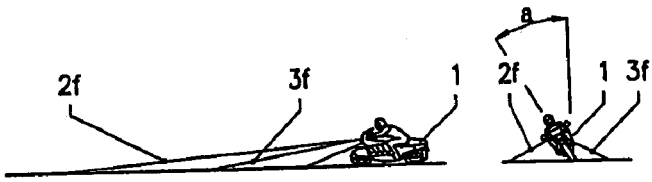
FIG. 5 shows the light-beam pattern of the inventive headlight unit in a right-hand curve.
Figure 5:
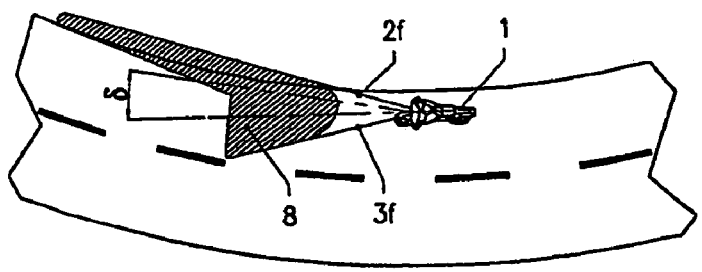
Figure 8:
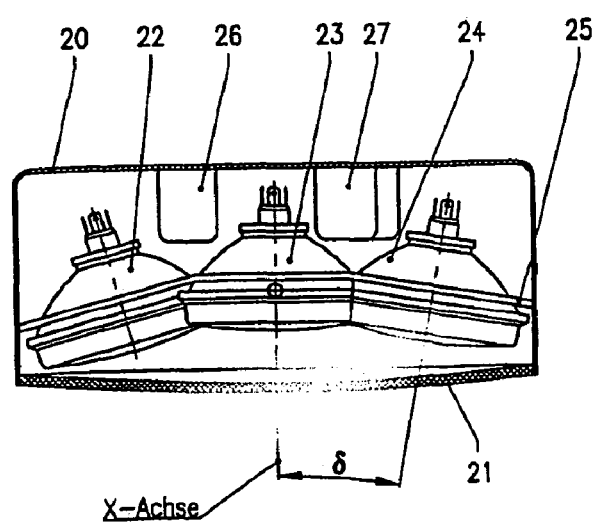
FIG. 8 shows a section according to VIII-VIII of FIG. 7.

In a right-hand curve being negotiated by motorcycle 1, as illustrated in FIG. 4, there is obtained according to FIG. 5 an illuminated area 8 with boundary beams 2f and 3f. This light-beam pattern, which corresponds to illuminated area 8, is skewed slightly by an angle δ toward the inside of the curve. The skew angle δ of left headlight 24 is indicated in FIG. 8 and has a value of about 5°. Thereby the asymmetric branch of the light-beam pattern is made to travel along the inside boundary of the driving lane, in conformity with the regulations.

To avoid the situation in which the light pattern of headlight unit (13) perceived by oncoming traffic varies whenever individual headlights are turned on and off during negotiation of a curve, two inactive light sources, or in other words (22) and (24) during straight-ahead driving, (22) and (23) on the right-hand curve or (23) and (24) on the left-hand curve, can be operated with lower illuminating power than the remaining third light source in each case. In other words, all three light sources are turned on at all times. In the right-hand curve, the two right headlights (22) and (23) are operated with non-blinding illuminating power, while left headlight (24) is operated with full illuminating power. In the left-hand curve, the two left headlights (23) and (24) are operated with non-blinding illuminating power, while right headlight (22) is operated with full illuminating power. During straight-ahead driving, the two outside headlights (22) and (24) are operated with relatively low illuminating power, while center headlight (23) is operated with full illuminating power. With this control circuit, the overall contour of activated headlight unit (13) is constantly perceived as a complete light pattern by oncoming traffic.

As a result, depending on degree of lean, only the headlight projecting its beam pattern onto the driving lane in the manner most favorable for the respective degree of lean is operated with full illuminating power. Thus the overall light contour of activated headlight unit (13) is always constantly perceived as a uniform signal pattern by oncoming traffic.

Figure 6:
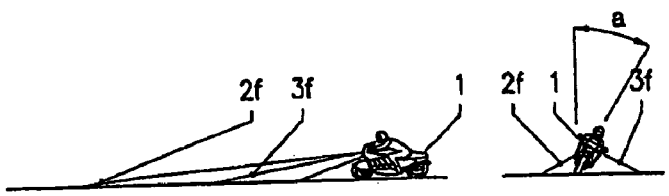
FIG. 6 shows the light-beam pattern of the inventive headlight unit in a left-hand curve.
Figure 6:
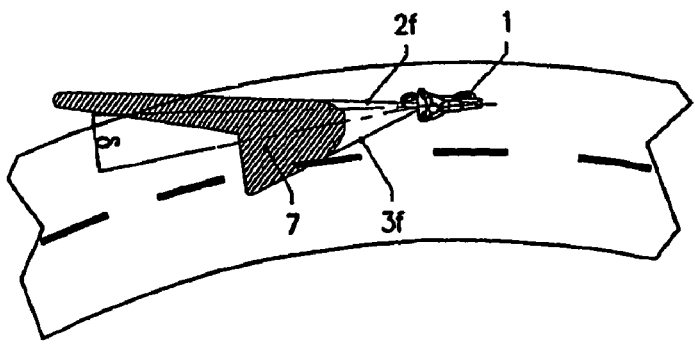

FIG. 6 shows the diagram corresponding to FIG. 5 for a left-hand curve. In this case right headlight 22 is used. It is also skewed by an angle δ toward the central headlight, as is evident once again from FIG. 8. Right headlight 22 is skewed by a slightly larger amount than left headlight 24, namely by about δ=7°. Thereby illuminated area 7 is deflected more toward the inside of the left-hand curve. In both this case and that of negotiation of a right-hand curve according to FIG. 5, the production of a blinding beam is effectively prevented.

For the purpose of illustration, the light-beam patterns corresponding to the prior art in FIGS. 1 to 3 and to the condition achieved with the inventive headlight unit in FIGS. 5 and 6 are accompanied by additional diagrams of the motorcycle driver in side view and in front view respectively, the beam profile being illustrated in the direction of a vertical plane. The additional diagrams and reference symbols are understandable in themselves, and so each of the said figures can be considered as a complete diagram.

Figure 7:
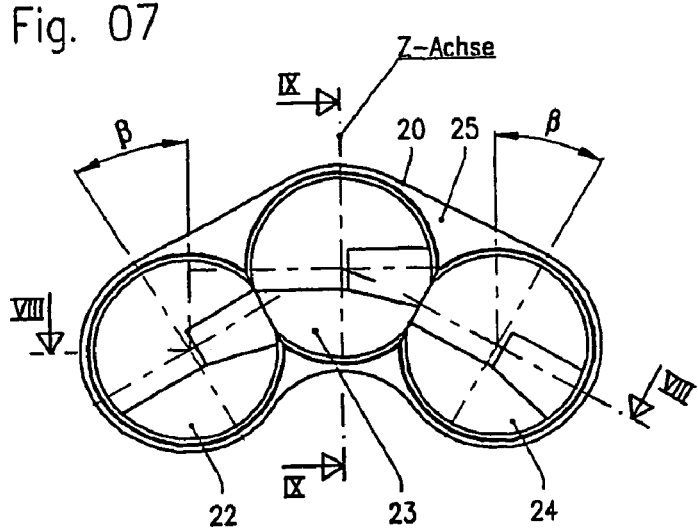
FIG. 7 shows the inventive headlight unit in schematic front view.
Figure 9:
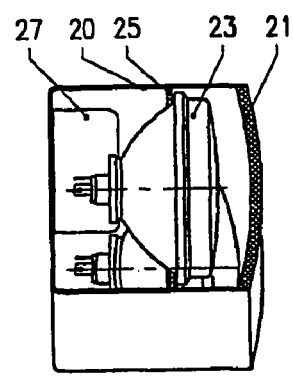
FIG. 9 shows a section according to IX-IX of FIG. 7.

FIGS. 7 to 9 schematically show the construction of the inventive headlight unit, which in the present case has the form of a triple-faceted headlight unit, in which the two lateral headlights 22, 24 are mounted lower than central headlight 23. Three commercially available headlights 22, 23, 24 with high and low beams are installed close beside each other in a housing 20. The three individual headlights can be fixed individually and adjustably on a mounting plate 25. They are disposed rearward of a front lens 21, which seals headlight housing 20 and protects the internals of housing 20 from environmental influences.

During straight-ahead driving, only central headlight 23 is turned on. This is also the case for gentle curves, which are negotiated with relatively low degrees of lean up to a roll angle α of 10 to 20°, preferably 15°. Right headlight 22 and left headlight 24 are expediently turned off during straight-ahead driving with dipped beam.

On a left-hand curve, right headlight 22 is turned on as soon as minimum roll angle α is exceeded, and the other two headlights are then turned off. Right headlight 22 is mounted in such a way that, when viewed from the front, it is turned around its optical longitudinal axis by an angle of β=30° in counterclockwise sense to compensate for inclination; in addition, it is mounted in such a way that it is skewed toward central headlight 23 by a skew angle of δ=7°, around an axis parallel to the Z axis, so that the driver's visibility range in the direction of the inside of the curve is improved.

Left headlight 24 is turned on for illumination during negotiation of right-hand curves upon passage through a minimum roll angle of α=15°. During negotiation of such curves, the other two headlights are turned off. The left headlight is mounted in such a way that it is also turned by an angle of β=30° in clockwise direction to compensate for inclination. It is also positioned in such a way that it is skewed around the Z axis toward central headlight 23 by the skew angle of δ=5°. Thereby the driver's visibility range in the direction of the inside of the curve is considerably improved.

Besides the three headlights, electronic unit 26 for switching the power circuit is also installed inside headlight housing 20, as is a computer 27 together with longitudinal-axis sensor and vertical-axis sensor, which are not illustrated in detail.

The power circuit contains solid-state switches for the headlight lamps and an integrated failure-detection circuit for the individual lamps.

The longitudinal-axis sensor is oriented in the direction of the X axis, and it measures the angular velocity of the roll motion of the vehicle as it begins and ends negotiation of the curve.

The vertical-axis sensor is oriented in the direction of the Z axis, and it measures the angular velocity of the vehicle around the center of the curve being negotiated. Computer 27 calculates the inclination of the vehicle around the X axis from the sensor signals, and controls actuation of the power circuit during passage through the minimum roll angle α.

As a result, the angular error in recreating the light-beam pattern during negotiation of a curve is now at most plus or minus 15°, whereas, by comparison, the angular error in motorcycles with standard headlights is as large as 45°, thus illustrating the great contribution of the inventive proposal toward improvement of traffic safety.

In a further embodiment, a dimming feature is utilized wherein one or more of the headlights are operated at a reduced illumination relative to a full illumination, i.e. normal illumination. Therein, a dimming feature is utilized wherein all three headlights 22, 23, 24 are illuminated at all times. Thus, if the motorcycle is traversing a straight-away segment, the central headlight 23 is at full illumination and the lateral headlights 22, 24 are at a reduced illumination. It is envisioned, that the illumination is reduced to 25% of the full illumination, i.e. ¼ of the full illumination.

When the motorcycle exits a straight-away and makes a left-hand turn, for example, the right headlight 22 is then switched to full illumination while the illumination of the central headlight 23 is reduced and the left headlight 24 maintains its reduced illumination.

Similarly, when the motorcycle exits a straight-away and negotiates a right-hand turn the left headlight 24 is then switched to full illumination while the illumination of the central headlight 23 is reduced, to for example 25% of full illumination, and the right headlight 22 maintains its reduced illumination.

In yet a further embodiment, if the motorcycle is traversing a straight-away segment, the central headlight 23 is at full illumination. When the motorcycle exits a straight-away and makes a left-hand turn, for example, the right headlight 22 is then switched to full illumination while the illumination of the central headlight 23 is reduced relative to the full illumination, of for example 25% relative to the full illumination.

Similarly, when the motorcycle exits a straight-away and negotiates a right-hand turn the left headlight 24 is then switched to full illumination while the illumination of the central headlight 23 is reduced to, for example, 25% of full illumination.

It should be appreciated that the reduction of illumination is relative to the full illumination and a reduced illumination at high-beam may be more or less than full-illumination as measured by lumens and/or foot-candles. Thus, in one embodiment the dimming feature may be utilized during both high and low beam operation of the headlight units. That is, the dimming feature may be utilized when the operator selects low beam headlights as well as when he selects high beam operation and need not require operator intervention to engage or reengage the dimming feature when the operator selects between low and high beams during the course of the same drive.

What is claimed is:

1. A headlight unit for a single-track two-wheeled vehicle, which experiences an inclination around its longitudinal axis (X) while negotiating a curve, the headlight unit comprising:
   a central headlight oriented straight ahead to illuminate straight-ahead of the vehicle;
   a right lateral headlight mounted right of the central headlight, mounted turned downward around its optical axis by an inclination angle (β) to compensate for inclination, and mounted facing leftwards to illuminate a left-hand curve wherein a right portion of an outside rim is disposed out of plane with respect to the central headlight;
   a left lateral headlight mounted left of the central headlight, mounted turned downward around its optical axis by the inclination angle (β) to compensate for inclination, and mounted facing rightwards to illuminate a right-hand curve wherein a left portion of an outside rim is disposed out of plane with respect to the central headlight;
   a sensor-controlled correction device in communication with all headlights to generate a light-beam pattern, the correction device comprising an electronic control unit,
   wherein when the vehicle is substantially upright, the correction device switches the central headlight to full illumination and the lateral headlights to reduced illumination; and
   wherein when the vehicle is negotiating the curve having a minimum roll angle (α), the correction device switches the central headlight to reduced illumination and one of the left and right headlights to full illumination.

2. A headlight according to claim 1 wherein the headlights (22, 24) laterally adjoining the central headlight (23) are mounted lower than the central headlight (23) relative to the upright orientation of the vehicle (1).

3. A headlight according to claim 1, wherein the headlights (22, 24) laterally adjoining the central headlight (23) are each mounted in such a way that they are skewed toward the middle headlight (23), around their axis parallel to the vertical axis (Z) of the vehicle (1), so that their optical axes form, together with a middle plane of the vehicle (1) defined by the longitudinal axis (X) and vertical axis (Z), a skew angle (δ).

4. A headlight according to claim 1, wherein the angle (β) for compensating for inclination is 25 to 35°.

5. A headlight according to claim 1, characterized in that the roll angle (α) is 10 to 20°.

6. A headlight according to claim 3, wherein the skew angle (δ) is 4 to 8°, and in that preferably the right headlight (22) in the case of traffic driving on the right and the left headlight (24) in the case of traffic driving on the left is skewed slightly more than the respective other headlight.

7. A headlight according to claim 1, wherein when the correction device is activated, the headlights are actuated by the control unit in such a way that the lateral headlights (22, 24) are turned on or off before the central headlight (23) is turned off or on respectively.

8. A headlight according to claim 1, wherein the headlights of the headlight unit are mounted in a common headlight housing (20).

9. A headlight according to claim 8, wherein a sensor unit and the control unit are also installed in the headlight housing (20) or are connected thereto.

10. A headlight according to claim 8, wherein the headlight housing (20) is equipped with the three headlight lamps (22, 23, 24), each with multiple reflectors for high and low beams, and with a front lens provided with dispersion sections (21) adapted to the lamps.

11. A headlight according to claim 1, wherein the control unit further comprises a safety circuit, which turns on the lateral headlights (22, 24) with appropriate power distribution if the central headlight (23) fails, and which turns on the central headlight (23) with full power if at least one of the lateral headlights (22, 24) fails.

12. A headlight according to claim 1, wherein the correction device further comprises a sensor unit containing two sensors, one being a longitudinal-axis sensor that measures the vehicle inclination around the longitudinal axis (X), and the other being a vertical-axis sensor that measures the vehicle motion around the vertical axis (Z) during negotiation of a curve, each sensor sending signals proportional to the angular velocity to the control unit.

13. The headlight unit of claim 1, wherein the reduced illumination is 25% of the full illumination.

\* \* \* \* \*